United States Patent
Douglis et al.

(10) Patent No.: US 6,587,877 B1
(45) Date of Patent: Jul. 1, 2003

(54) MANAGEMENT OF TIME AND EXPENSE WHEN COMMUNICATING BETWEEN A HOST AND A COMMUNICATION NETWORK

(75) Inventors: Frederick Douglis, Somerset, NJ (US); David Morris Kristol, Summit, NJ (US); Paul Krzyzanowski, Fanwood, NJ (US); John Andrew Trotter, New Providence, NJ (US); James Paul Sienicki, Edison, NJ (US); William N. Schilit, Palo Alto, CA (US)

(73) Assignees: Lucent Technologies Inc., Murray Hill, NJ (US); AT&T Corp., New York, NY (US)

( * ) Notice: Subject to any disclaimer, the term of this patent is extended or adjusted under 35 U.S.C. 154(b) by 0 days.

(21) Appl. No.: 08/823,564

(22) Filed: Mar. 25, 1997

(51) Int. Cl.$^7$ ............................................. G06F 15/173

(52) U.S. Cl. ...................... 709/224; 709/202

(58) Field of Search ............................ 380/49; 709/139, 709/217, 202, 203, 232, 219, 224, 226, 247, 220; 209/124, 229, 202; 704/8; 370/331, 313, 58, 329, 261, 351; 379/93.12, 27, 207, 114; 364/401; 701/201; 340/825.49; 710/6; 455/466; 705/26, 32, 44; 700/11; 713/201

(56) References Cited

U.S. PATENT DOCUMENTS

| | | | | |
|---|---|---|---|---|
| 4,649,533 A | * | 3/1987 | Chorley et al. ................. 370/58 |
| 5,210,845 A | * | 5/1993 | Crawford et al. ........... 711/128 |
| 5,311,423 A | * | 5/1994 | Clark .......................... 364/401 |
| 5,532,939 A | * | 7/1996 | Psinakis et al. ............. 709/226 |
| 5,664,206 A | * | 9/1997 | Murrow et al. ................. 704/8 |
| 5,673,322 A | * | 9/1997 | Pepe et al. ..................... 380/49 |
| 5,680,392 A | * | 10/1997 | Semaan ........................ 370/261 |
| 5,680,551 A | * | 10/1997 | Martino, II ................. 709/226 |
| 5,708,655 A | * | 1/1998 | Toth et al. ................... 370/313 |
| 5,715,474 A | * | 2/1998 | Burke et al. .................... 710/6 |
| 5,732,074 A | * | 3/1998 | Spaur et al. ................. 370/313 |
| 5,771,355 A | * | 6/1998 | Kuzma ........................ 709/232 |
| 5,790,801 A | * | 8/1998 | Funato ........................ 709/229 |

(List continued on next page.)

OTHER PUBLICATIONS

Gessler et al, PDAs as Mobile WWW Browsers, Computer Network and ISDN Systems, Dec. 1995.*
Abrams et al. Caching Proxies: Limitations and Potentials. www.w3.org/conferences/www4/papers/155/, Oct. 1995.*
Schilit et al, TeleWeb: Loosely connected access to the World Wide Web, 1996.*
Hurwitz et al, A Web–Based System for Conferencing and Collaboration, 1994–1995.*
Hurwitz et al, A Web–based system for Conferencing and Collaboration, 1995. www.ai.mit.edu/projects/iiip/doc/open–meeting/paper.html.*
Oguchi et al, A study of caching Proxy Mechanisms Realized on Wide are Distributed Networks, IEEE 1996.*

*Primary Examiner*—Mark Powell
*Assistant Examiner*—Thong Vu

(57) ABSTRACT

A system and method for managing time and expense when communicating between a host and multiple network connections. A server program, inserted between an information requesting device and the network connections, reconfigures the information requesting device forcing the information requesting device to pass all requests through the server program. The server program then determines what type of network is being connected. Additionally, the server program makes costs visible to the user, warns the user when pre-specified budgets are exceeded, postpones actions to a later time when conditions are met, and automatically adapts user customization and system configuration values to the changing conditions of use. This allows asynchronous style browsing in which users can work disconnected from a cache of documents or trade off communication cost against information needs.

26 Claims, 5 Drawing Sheets

U.S. PATENT DOCUMENTS

| | | | | |
|---|---|---|---|---|
| 5,822,539 A | * | 10/1998 | Van Hoff | 709/139 |
| 5,825,759 A | * | 10/1998 | Liu | 370/331 |
| 5,838,910 A | * | 11/1998 | Domenikos et al. | 709/203 |
| 5,838,916 A | * | 11/1998 | Domemnikos et al. | 709/219 |
| 5,838,927 A | * | 11/1998 | Gillon et al. | 709/247 |
| 5,845,077 A | * | 12/1998 | Fawcett | 709/124 |
| 5,881,131 A | * | 3/1999 | Farris et al. | 379/27 |
| 5,889,474 A | * | 3/1999 | LaDue | 340/825.49 |
| 5,897,622 A | * | 4/1999 | Blinn et al. | 705/26 |
| 5,903,882 A | * | 5/1999 | Asay et al. | 705/44 |
| 5,919,247 A | * | 7/1999 | Van Hoff et al. | 709/217 |
| 5,923,735 A | * | 7/1999 | Swartz et al. | 379/93.12 |
| 5,933,425 A | * | 8/1999 | Iwata | 370/351 |
| 5,941,988 A | * | 8/1999 | Bhagwat et al. | 713/201 |
| 5,944,793 A | * | 8/1999 | Islam et al. | 709/220 |
| 5,948,040 A | * | 9/1999 | DeLorme et al. | 701/201 |
| 5,987,108 A | * | 11/1999 | Jagadish et al. | 379/114 |
| 5,991,742 A | * | 11/1999 | Tran | 705/32 |
| 6,026,440 A | * | 2/2000 | Shrader et al. | 709/224 |
| 6,029,092 A | * | 2/2000 | Stein | 700/11 |
| 6,075,777 A | * | 6/2000 | Agrawal et al. | 370/329 |
| 6,112,099 A | * | 8/2000 | Ketola | 455/466 |
| 6,138,162 A | * | 10/2000 | Pistriotto et al. | 709/229 |
| 6,173,311 B1 | * | 1/2001 | Hassett et al. | 709/202 |
| 6,185,625 B1 | * | 2/2001 | Tso et al. | 709/247 |
| 6,188,756 B1 | * | 2/2001 | Mashinsky | 379/207 |

* cited by examiner

| NETWORK INTERFACE | | | |
|---|---|---|---|
| ETHERNET | MODEM 1 | MODEM 2 | FDD 1 |

BUDGET CONSTRAINTS

PREFERENCE VARIABLES

TIME CONSTRAINTS

HOST DISCONNECTED

TELEWEB VARIABLES

COMMUNICATIONS MANAGER

| COMMUNICATIONS BANDWIDTH | COMMUNICATIONS COST | ANNOTATE ANCHORS | CONNECTIVITY | USER PREFERRNCES | TIME OF DAY |
|---|---|---|---|---|---|

CONDITIONAL ACTIONS

| NETWORK INTERFACE | BUDGET | CONDITION | DISPOSITION |
|---|---|---|---|

SETTINGS

CONDITION VIOLATED

NETWORK INTERFACE

EQUAL

● ETHERNET
○ MODEM 1
○ MODEM 2

NOT  (...)  AND  OR

DISPOSITION

● CANCEL
○ POSTPONE
○ OVERIDE

UNTIL ☐ DAYS ☐ HOURS ☐ MINUTES

SUBMIT CONDITIONAL ACTION

MANAGEMENT OF TIME AND EXPENSE WHEN COMMUNICATING BETWEEN A HOST AND A COMMUNICATION NETWORK

BACKGROUND OF THE INVENTION

1. Field of the Invention

The present invention is directed to management of time and expense when communicating between a host and a network. More particularly, the present invention is directed to a method and system for management of time and expense of information access over multiple networks using a host.

2. Description of the Related Art

The World Wide Web (WWW) has surged to prominence since the introduction of graphic browsers. Browsers are software that allow a person to look through information by repeatedly viewing and selecting items. A list of menu items or a page of information is usually provided when browsing. After a user reads the information provided, he or she may then select an item. The browser then follows the reference and retrieves new information. Two very well known Web browsers are NCSA Mosaic™ and Netscape Navigators™.

Users of the Internet and WWW regularly rely on widely distributed resources. Users can add hypertext links to their own documents and compile hotlists. Thus, people have become very reliant on continuous, high-speed, low-cost networks to access information that they need.

In current environments users expect to be connected to a network all the time through a predictable connection that is relatively inexpensive and that generally costs a fixed amount. Users also expect resources to be available continuously. For example, if a document was retrieved a week ago, that document should still be retrievable today. However, expectations and reality are not the same. High-bandwidth, low-cost communications are not ubiquitous. In particular, a mobile user has to deal with multiple networks that use different technologies that exhibit widely differing bandwidths, latency, availability and fee structures. In addition, the user can expect to be disconnected for extended periods of time. Thus, there is no truly transparent way to make a Web browser that runs on a mobile host operate the same as a Web browser that runs on a desktop system.

Because of a user's expectations, it is imperative that the user should be able to browse the WWW anytime from anywhere whether or not the user is connected to a continuous, high-speed, low-cost network.

Further, mobile users encounter problems in that they access the WWW over multiple networks that have different data rates and fee structures. A number of mobile host systems have been proposed. These include using personal digital assistants (PDAs) as mobile WWW browsers. A PDA functions as a specialized graphical terminal communicating with a dedicated stationary host.

Additionally, powerful notebook class computers have been proposed as platforms for mobile WWW browsing. For the most part, these systems run on a mobile host in conjunction with a dedicated processor running on a stationary server. The system caches data on both a mobile host cache and the stationary server. This reduces wait periods caused by fetching remote documents and supports disconnected operation.

One such system is the Mowgli system which uses HyperText Transport Protocol (HTTP) header compression for improved bandwidth and long-lived connections to avoid slow-start problems associated with the Transmission Control Protocol (TCP). Another system is MobiScape which uses system profiles on both the mobile and support station to read user supplied lists of Uniform Resource Locators (URLs) and fetch those documents based on URL specific "recycling periods." These and other conventional systems concentrate on improving latency by communicating with stationary servers running special protocols. However, neither of these systems nor any of the prior art advance the issue of monetary cost control nor do they include a "reactive architecture" that allows user controlled adaptation under various operating conditions. At this time, there is no way to quickly and efficiently make time-money trade-offs that depend on a user's information needs.

SUMMARY OF THE INVENTION

It is an object of the present invention to provide a system and method for making time-money tradeoffs given information needs at the time of accessing a network.

It is another object of the present invention to provide a host, including an information requesting device and a server program, connectable to any of a number of different kinds of networks.

It is a further object of the present invention to allow a person to browse the WWW anytime and anywhere whether or not the person is connected to a continuous, low-cost, high-speed network.

It is yet another object of the present invention to provide a reactive architecture that supports user-specified adaptation under various operating conditions.

It is still a further object of the present invention to provide budget monitoring, conditions for postponement, user customization, and system configuration values that may or may not automatically adapt to the changing conditions of use.

It is a further object of the present invention to provide an asynchronous, e-mail style browsing such that users can work disconnected from a cache of documents or can implement a trade-off of communication cost against information needs.

It is still another object of the present invention to provide a system for accessing the WWW that is unobtrusive and predictable, in addition to providing graceful degradation of service across increasingly difficult conditions.

These objects are obtained by providing a system for information access over multiple networks. The system includes a host, having a server program and an information requesting device therein, which is connected over any of a number of different types of networks to the Internet and WWW. The server program intercepts requests from the information requesting device before they are passed to the WWW to determine if specific conditions have been met. The server program can be configured to automatically and dynamically set preferences including budgets and time constraints for various means of communications such as over Ethernet or modem.

The server program includes a caching proxy, a user interface server for managing the caching proxy, databases of variables and conditional actions. In addition, a communications manager is provided for managing network connections and informing the system of changes.

A method is provided for information access over multiple network connections. The method includes loading a server program and reconfiguring an information requesting device such that all requests from the information requesting device pass through the server program before being sent to the WWW to determine if time/cost considerations have been met. The method also includes the steps of running the server program on a mobile host, sending a request to the WWW from the information requesting device via the server program, checking whether the request can be satisfied from a cache, checking whether budget criteria have been met and checking whether time limits have been exceeded. Further, the method includes redirecting the request to a user interface page if the original request cannot be satisfied, and notifying a user that the request has been redirected, allowing the user to continue, cancel, or postpone the request.

Another method includes managing time/cost information of requests over multiple network connections in which a budget monitor process mediates between a host requesting information and one of the multiple network connections. The budget monitor, when presented with a request, determines whether it can make a connection to a network subject to the user's pre-specified budget requirements, such as availability and costs of communication channels, the quality of service of the channels, and the usage and accumulated costs of the channels. If it can, the request proceeds. Otherwise, the user is prompted regarding what type of action to take. The requests for documents can be postponed and then triggered at a future time when the time/cost of retrieval satisfies the user's requirements. In addition, the method can indicate to the user the time/cost of traversing a hypertext link.

A communication device and method includes a server program having a database for storing a plurality of variables for each of multiple network connections including the state of the network, customization settings and configuration settings. A page alerts a user that one or more variables for a connected network is violated. A user can then continue, cancel or postpone an action depending on the violated variables.

These objects, together with other objects and advantages which will be subsequently apparent, reside in the details of construction and operation as more fully hereinafter described and claimed, reference being had to the accompanying drawings, wherein like reference numerals refer to like parts throughout.

BRIEF DESCRIPTION OF THE DRAWINGS

FIG. 2 is a database in a user's computer according to the present invention;

FIG. 4 is a diagram of a page that appears when a specified condition stored in the database is not met.

DESCRIPTION OF THE PREFERRED EMBODIMENTS

A system and method of the present invention provides and manages conditions and variables when communicating between a browser and a communications network. The present invention provides budget monitoring which warns users when operations are about to exceed or have exceeded pre-specified limits, conditional actions that allow a user to postpone communication and other actions by queuing monitored requests that trigger actions when the associated conditions are met, HyperText Markup Language (HTML) annotation that changes the appearance of documents so users can see which linked objects are in a caching proxy before they are traversed, and dynamic customization and configuration settings that can change values automatically as an effect of changing the conditions of use. The architecture of the system provides simplicity, predictability and flexibility, allowing a user to fully customize operations while supporting commercial browsers. Particularly, the present invention is well-suited for use with a mobile host such as a lap-top computer in which communications cost control is very important. The present invention exposes costs, monitors costs, limits results, postpones operations, interrupts transfers and maximizes channel utilization while allowing the mobile host to change interfaces, change networks, change settings, and change capabilities.

Figure 1:
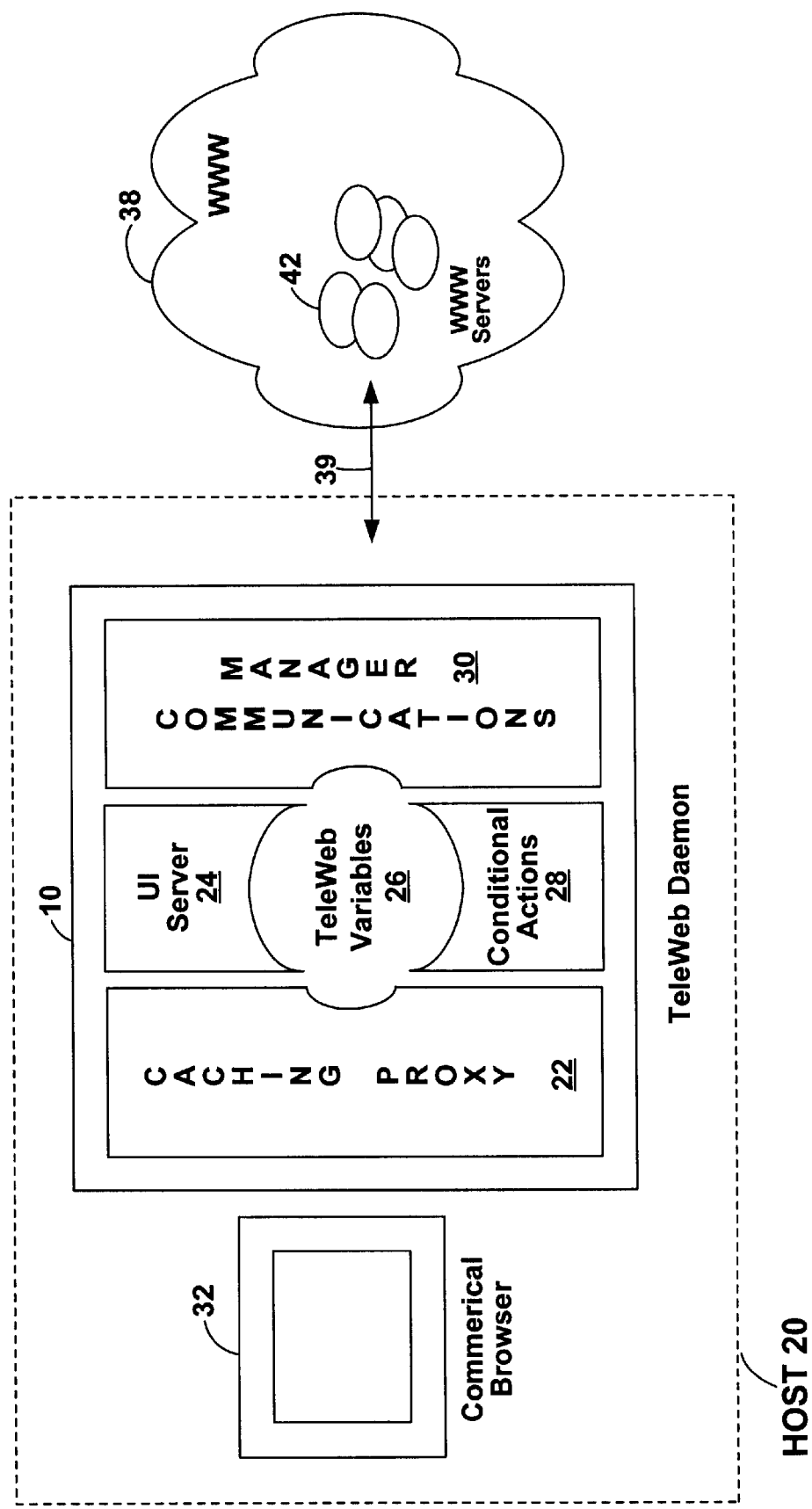
FIG. 1 is a diagram of a system architecture according to the present invention.

A diagram of the system architecture according to the present invention is shown in FIG. 1 and includes a server program that provides service to other programs on a mobile host 20. The server program of the present invention is referred to as a TeleWeb daemon 10, TeleWeb being the name of a project carried out by AT&T. The TeleWeb daemon 10 includes a caching proxy 22 having a cache and a proxy, user interface server 24, databases of TeleWeb variables 26 and conditional actions 28, and a communications manager 30. The TeleWeb daemon 10 is installed on the mobile host 20. The mobile host 20, which includes an information requesting device, such as a commercial browser 32, and the TeleWeb daemon 10, is connected to the WWW 38, including WWW servers 42, over any number of different networks 39. A user configures the commercial browser 32 on the mobile host 20 by setting its HTTP proxy to be the local host's TeleWeb daemon 10 and disabling the browser's 32 disk and memory caches (not shown). That is, the TeleWeb daemon 10 changes a setting in the commercial browser 32 so that the TeleWeb daemon becomes the browser's 32 proxy. After the browser 32 is reconfigured it is then forced to contact the TeleWeb daemon 10 for each request. That is, all requests from the browser 32 are passed through the TeleWeb daemon 10 before being passed to one of the networks 39. A small, indiscernible delay is introduced since both processes run on the same mobile host 20.

Thus, the TeleWeb daemon 10 takes responsibility for a number of browser 32 related preferences permitting automatic and dynamic control over their settings. Examples of these are the proxy and cache consistency level. The cache consistency level is, for example, either "once per session," "every time," or "never" and it determines how up to date the user wants the material in the cache. This level may vary depending on the cost of communication. The proxy and cache consistency level will normally be the original value from the user's browser 32 but may be set to automatically change according to the location of use, such as the network interface being an Ethernet or modem. The user is also made aware of the freshness of the document.

The caching proxy 22 of the present invention is an intermediary that receives a request from the browser 32. The caching portion receives a request from the proxy to determine if a local copy is available in the cache and whether the cached copy is stale before making a request to the network. A copy of a document is stored in the caching proxy 22 under specified conditions such as time, level of importance, etc., and according to the rules of HTTP protocol. The TeleWeb daemon 10 of the present invention can override rules of protocol for the browser and server regarding fresh copies. For example, if the network connection is a low speed connection, it may be preferable, due to cost, to access a document in the cache and return a stale copy.

Therefore, cost and consistency can be traded off to aggressively use storage and to interact with the user.

Because the TeleWeb daemon 10 accepts Uniform Resource Locator (URL) requests from the browser 32, the result is either supplied from a cache in the caching proxy 22, fetched from the network 39 or used as an HTTP redirect to produce a conditional action form. If the client makes a generic request, the cache can determine if a copy stored in the cache is fresh. If the copy in the cache exceeds a predetermined expiration time, the caching proxy 22 makes a conditional request to the original server for an updated copy. Further, the cache for the mobile host 20 is less inclined to remove a document and may choose to keep it and consume more disk space. The cache can also aggressively use disk space and a variable amount of storage rather than a fixed allocation. Because of this, the cache must be able to monitor resource usage and relinquish disk space, or memory, if other applications need those resources.

The cache is able to interact with a user to determine how replacement of specific resources should occur. If the user believes a resource is important then the user can mark it "keep" or "keep as long as possible." If the resource is unimportant then the user can mark it "purge" for example. Additionally, the user could be asked, by way of a prompt, which resources to remove when it is necessary to obtain room in the cache.

The caching proxy 22 also annotates HyperText Markup Language (HTML) documents as they are returned to the browser 32 from the network or the cache. That is, the caching proxy 22 intercepts information returned from the WWW 38 and examines it for hypertext links. The caching proxy 22 then determines whether it has copies of the linked objects stored in its cache. If the cache does not contain copies of the linked objects it can rewrite the page containing the links and place warning marks adjacent to the links for objects that are not found in the cache. TeleWeb variables can be set to define the warning marks for the links. The marks are specified by HTML and may be inserted before and/or after the HTML of the page for the links. The HTML markup thereby informs the user that the linked object is absent from the cache.

The user interface 24 provides ways to customize what the annotation of the hypertext links looks like. In addition, the user interface 24 makes a number of forms available for examining, creating and modifying variables and conditional actions as well as managing the disk cache. Because the user interface 24 is integrated with the TeleWeb daemon 10 the user need not leave the domain of the browser 32 to configure and interact with the TeleWeb daemon 10.

The communications manager 30 monitors operating conditions and invokes associated variables in dependence on the operating conditions. Thus, it keeps track of what is happening in the operating system and influences the caching proxy 22. It transparently sets up and tears down connections using the most efficient interface available. This allows the communications manager 30 to temporarily disconnect and then reconnect idle communications channels without interrupting the proxy in the caching proxy 22. This is a useful advantage when connecting to a network by way of a modem or wireless communications where open idle links cost money.

The communications manager 30 also informs the proxy of changing network conditions by setting action variables in a database 27. These variables include, but are not limited to, communication bandwidth, communication cost, connectivity, as well as related user preferences. Therefore, if the system connectivity changes, such as from a modem to Ethernet, the communications manager 30 sets new values for all appropriate variables. The user can also modify the behavior of the communications manager 30, for example, by specifying preferred network interfaces and configuring their costs by setting TeleWeb variables 26. Since the communications manager 30 supplies information regarding the connection status it assumes that if it is invoked by the caching proxy 22 then it should make every effort to establish a connection to satisfy the request in accordance with the user's budget requirements.

The conditional actions 28 and TeleWeb variables 26 are configured by the user in the TeleWeb daemon 10. The conditional actions 28 and TeleWeb variables 26 control preferences, budgets, time constraints, number of bytes downloaded, etc., for different types of communications. For example, the mobile host 20 could be connected to a network by way of Ethernet, modem, etc. Examples of these variables are shown in FIG. 2 which shows a database 27 in the TeleWeb daemon 10.

Figure 3:
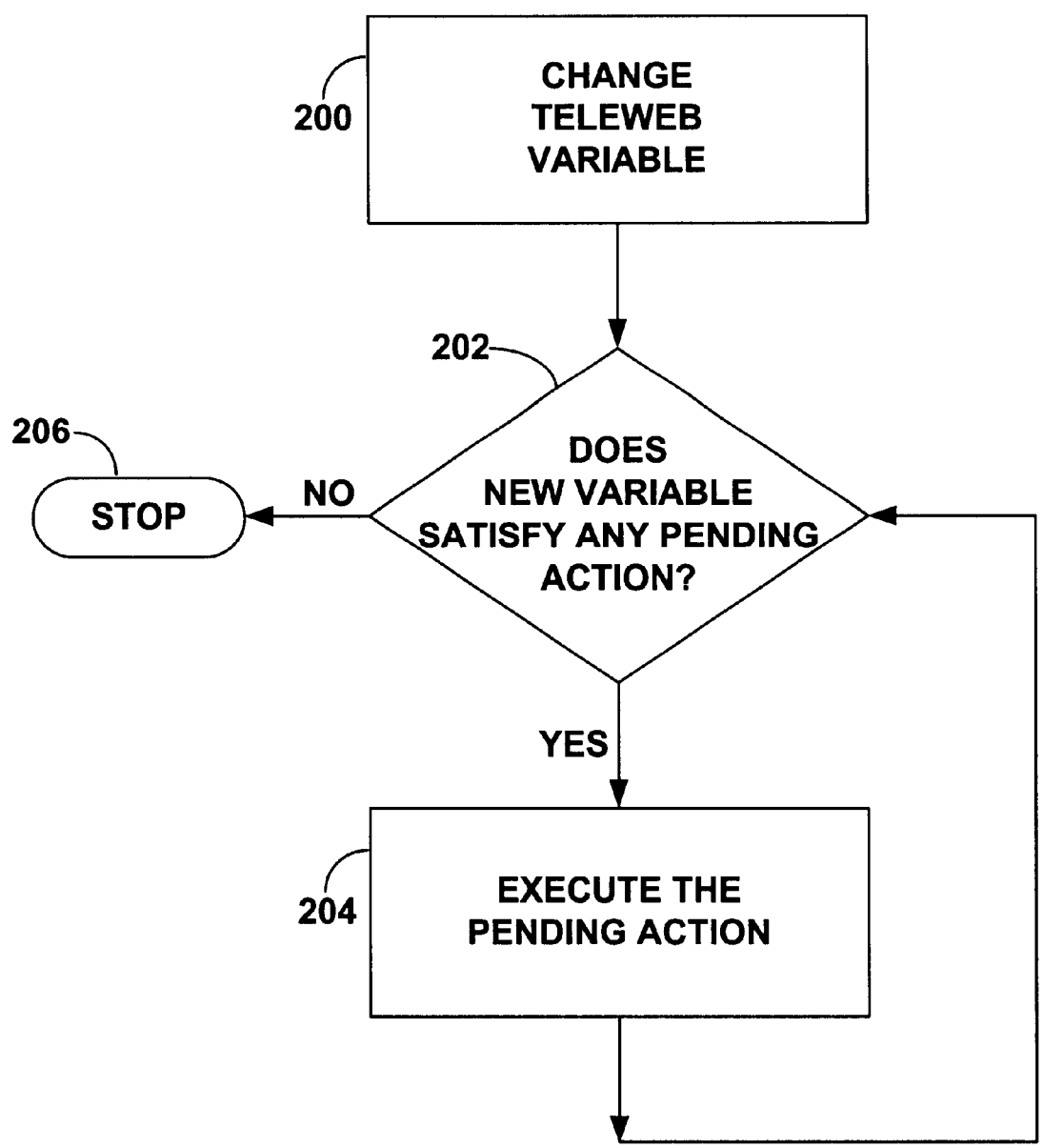
FIG. 3 is a flowchart explaining what occurs when a TeleWeb variable changes.

TeleWeb variables 26 in the database 27 reflect the internal state of the system as well as the current customization and configuration settings and are a main component in supporting the reactive architecture of the present invention. The TeleWeb variables 26 are central to the invention and are used at both a user and system level. Each variable has a type, a value and a descriptive text associated therewith for documentation purposes. The type of variable can include Boolean, integer, floating point, text, etc. The value can include cost, time, byte length, etc. Descriptive text explains to what the variable refers. For example, because users have different preferences depending on where they are browsing from, e.g., home, office, hotel, airport, they can create an HTML page for each preference group. The page can be titled "OFFICE" and include a form with TeleWeb variables and default values for each situation. Invoking the form can set all variables at once, if desired, using the user interface server 24 for changing TeleWeb variables. The flowchart in FIG. 3 explains what occurs when a TeleWeb variable changes. First, a TeleWeb variable in step 200 is changed, either by the user or by the system (e.g., communications manager 30). For example, a network connection, user action, etc., changes. It is then determined in step 202 whether the new variable setting satisfies any pending action such as a request. If yes, the pending action is executed in step 204. That is, if the pending action was a request, the request is issued. Then, the operation proceeds back to step 202. If the new variable does not satisfy any pending action in step 202, the operation continues to step 206.

Conditional actions 28 in the database 27 describe, for example, preferences and budgets for different network interfaces. For example, a connection time limit may be longer when the host is connected to Ethernet because it is faster and less expensive than a modem connection. An example of a conditional action page 40 could be entitled "SETTINGS," as shown in FIG. 4. This page 40 appears when a redirection occurs when a requested URL is not in the cache and the host is either disconnected or the operation does not meet the budget constraints, for example. The page 40 includes variables and default values for various situations. For example, FIG. 4 shows the page that might appear if the current network interface is a modem, because the user is accessing the network from a hotel room, and a conditional action requires that the network interface be Ethernet. Under a heading "Condition Violated" there is a selection area for a TeleWeb variable, such as "Network_Interface," another for a relational operator, such as "Equal," and a set of connecting operators, such as "Not," "(. . .)," "And," and "Or," that can be used to construct arbitrarily rich expressions, of which none are selected in FIG. 4. Also shown are possible values for the "Network_Interface" variable, of which "Ethernet" is selected. Thus, the failing condition shown is "Network_Interface Equal Ethernet."

Because the conditional action failed, the user must select what to do next. The user may select "Cancel" to terminate loading the object, as shown, "Override" to continue to load the object regardless of the violated condition, or "Postpone" to load the object at a future time as specified by conditional actions.

If a user creates a conditional action 28 for a particular situation, all variables for that situation can be set at once, if desired, using the user interface's 24 built in interface for changing variables in dependence on whether the condition is met. The user can also create conditional actions 28 that automatically invoke a user's preference.

Pending and completed conditional actions 28 can be examined through the user interface 24. The result of a completed action shows the status of the action plus a hypertext link to the cached resource, if one was returned. Additionally, the conditional action 28 can be continually or periodically active. For example, a recent copy of a newspaper can be periodically retrieved and cached on the user's computer whenever the user is connected to Ethernet.

Figure 5:
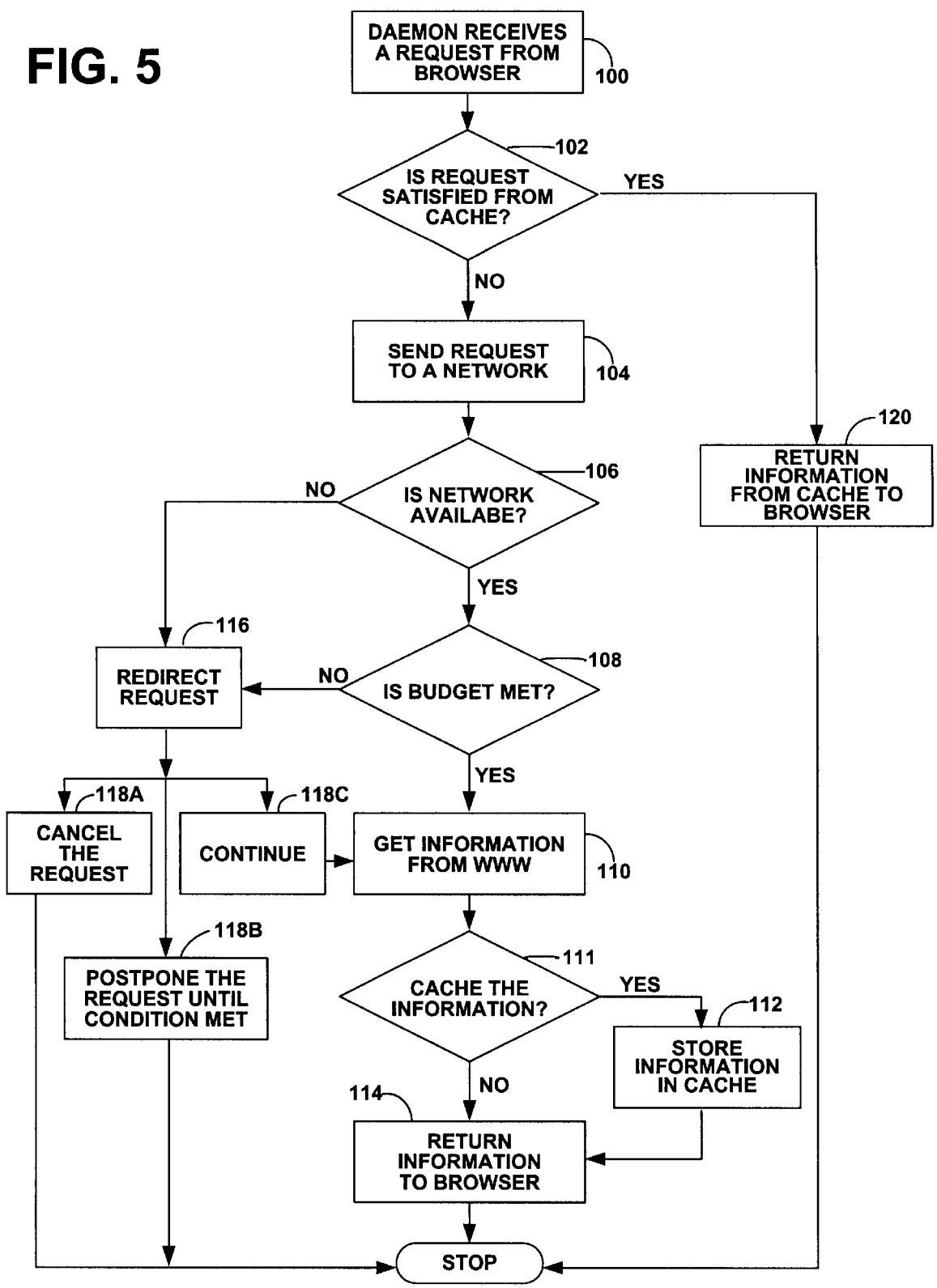
FIG. 5 is a flowchart explaining the operation of the present invention.

The operation between the browser 32, TeleWeb daemon 10, and networks 39, will be explained with respect to the flowchart in FIG. 5. The TeleWeb daemon 10 receives a request from the commercial browser 32 such as Netscape Navigator™ in step 100. The request can be for documents, for example. In step 102 the TeleWeb daemon 10 then determines whether the request can be satisfied from a cache in the caching proxy 22. If the request is satisfied in step 102, after the information is obtained from the cache the information is returned to the browser 32 in step 120. If the request is not satisfied from the cache in step 102, the request is sent through a budget monitor (not shown) in the TeleWeb daemon 10 to one of the networks 39 to retrieve the information. The budget monitor then determines, in step 106, whether the network is available and determines, in step 108, whether budget constraints are met. The budget constraints include decisions based on the characteristics of the request such as the information type, the size (in bytes) of the requested information, etc., and changing TeleWeb variables that reflect the availability and costs of communication channels, the quality of service of the channels, the usage and accumulated costs of the channels, etc., all in conjunction with the user's pre-specified budget requirements. If the network is available and budget constraints are met, step 110 obtains the information from the WWW 38. It is then determined whether the information should be cached in step 111. If yes, the information is stored in the cache in step 112. Step 114 returns the information in the cache to the browser 32. If the information is not to be cached, it is returned to the browser in step 114. If the network is not available in step 106 or the budget constraints are not met in step 108, the request is redirected in the user interface 24 in step 116 and the user is notified. The user then has the option of canceling, postponing, or continuing the request in steps 118A–118C. In step 118A, the user can cancel the request and the process is stopped. In step 118B, the user can postpone the request until a future condition such as when the time/cost of retrieval satisfies the user's requirements is met. In step 118C, the user decides to continue, essentially overriding the set conditions, and proceeds to obtain the information from the WWW 38. Thus, the present invention allows a user to manage time/cost requirements regardless of whether the user is connected over costly wireless networks and telephone networks or over slow heavily loaded local area networks and wide area networks, or when accessing slow information servers.

Additionally, the system indicates to the user the time/cost of traversing a hypertext link by annotating links that refer to non-cached documents. Further, when the caching proxy has started to fetch an object, and can determine how large the object is, then the system can show the user how much it will require in terms of communication time and cost to cache the object. The system can then query the user as to whether to the object should be fetched in total, only a portion should be fetched, or the process should be terminated. Further, links that are or are not in a local cache when the host is disconnected from a network can also be identified to the user.

An example of how the present invention operates will now be given. A user is connected to an Ethernet in the office. The user must attend a meeting. Therefore, the mobile host 20 is unplugged from the Ethernet and relies on a wireless LAN for the meeting. The user then goes home where he or she uses a telephone line for connecting to a network. All of these networks have different interfaces. The system of the present invention can switch among the various networks without a software restart due to the TeleWeb daemon 10 which "knows" how to interface with each network. Further, a "best" network may change over time. This is also accounted for in the TeleWeb daemon 10. For example, if a telephone is in use and an Ethernet is then plugged in as well, the system will use the Ethernet to establish a faster and cheaper connection. In addition, as mentioned above, the connection time and cost is monitored so that the TeleWeb daemon 10 automatically passes a request to a selected network, services the request from a cache, postpones the request or cancels the request. Further, the TeleWeb daemon 10 informs the user of time/costs so that the user can determine what action to take in dependence on budget requirements for the particular network interface that is connected and the characteristics of the request.

The above-mentioned features of the present invention provide the following advantages. Exposing costs to a user is an important factor in controlling cost. Cost information can include, but is not limited to, cumulative costs, time and costs remaining for a current operation, and time and costs for potential operations. For example, hypertext links corresponding to "expensive" linked objects that are not in the cache and must be fetched from the network can be marked. Quietly monitoring costs until a threshold or budget is reached or exceeded is another way to control costs. Once the threshold or budget is reached or exceeded, the user is informed through, for example, annotated HTML. The user can then decide to override the budget and continue accessing the information or quit the request.

Limiting results can also be employed as a method for controlling costs. For example, parameters can be toggled to reduce the amount of information returned such as "image downloading." This depends on whether the graphics in a requested document are necessary.

If a user is over budget, costs can also be controlled by allowing the operation to be invoked at a later time when inexpensive communication is possible or a new budget is in place. For example, a user can queue a link for later traversal if a linked object is discovered that is not in the cache and/or is too expensive to retrieve. The linked object can be retrieved during idle transmission periods or delayed until the user is connected to a low cost, high-bandwidth network such as Ethernet.

As noted above, costs can also be controlled by allowing downloads to be partially completed, for example, by specifying a byte range. The download can then be completed at a later time. Alternately, the download can be postponed to a later time.

Maximization of channel utilization is another feature of the present invention. Long spans of inactivity can occur between transmissions. Idle spans can be reduced by issuing many user requests together in one batch or by performing cache validation or cache prefetching on links that are likely to be taken. The actual link-following strategy will depend on the parameters of the link, particularly its cost model.

Another feature of the present invention is the ability to change interfaces. That is, a mobile host 20 can connect to a network in various ways. Ordinarily, this can cause problems because of the varying parameters associated with each connection. Ideally, the TeleWeb daemon of the present invention allows a user to plug into any network that is available, and for which the user is authorized, and the system can seamlessly switch to the new network without the user's intervention. The "reactive" design of the invention allows a user to define actions that execute when the conditions of use change.

The above mentioned features work together to provide asynchronous browsing such that users can work even when disconnected from a network or a user can trade off communications cost against information needs.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

For example, the idea of budget monitoring with respect to time and cost using conditional actions and variables can be used not only with wireless information access but also can be extended to telephone systems to budget long distance or local calls, calls to a particular area code, prefix or number, etc. The budgeting could be with respect to an accumulated cost for the day, month, etc., according to the fee structure at the time of the call and other conditions. Another example using the present invention would be for an electronic checkbook or credit card service that budget monitors as a person is writing a check. The budget monitor would inform the user whether the category entered such as dining, clothing, etc., has caused a budget condition to be violated.

What is claimed is:

1. A method of accessing information over multiple network connections using a host, said method comprising:
   a) installing an information requesting device on the host for requesting information from multiple network connections;
   b) installing software on the host for reconfiguring the information requesting device, the installing software including installing a caching proxy for receiving a request from the information requesting device;
   c) sending all requests from the information requesting device to the multiple network connections through the installed software, the installed software automatically controlling the sending of all requests from the information receiving device to the multiple network connections in accordance with preset conditions, the installed software checking whether the request can be satisfied from the cache proxy.

2. A method according to claim 1, wherein said installed software is a server program.

3. A method according to claim 2, wherein the host is a mobile host.

4. A method according to claim 3, wherein installing the specialized server program includes the steps of:
   i) installing a user interface for managing the caching proxy and checking network availability;
   ii) creating conditional actions, notifying a user if conditions are not met and allowing the user to perform an operation of one continuing, canceling, and postponing a request;
   iii) installing a communications manager for setting up and tearing down connections between the host and the multiple network connections and informing the system of any changes; and
   iv) installing variables regarding actions the server program is to perform under particular conditions.

5. A method of accessing information over multiple network connections through the use of a host including an information requesting device [and connected to one of the multiple network connections], said method comprising the steps of:
   a)
   receiving a request, from the information requesting device;
   b) checking whether the request can be satisfied from a cache;
   c) checking if the network is available;
   d) evaluating a budget-monitor expression supplied by the user and checking whether the budget condition defined by the budget-monitor expression is met;
   e) retrieving information from the World Wide Web if both of said steps c) and d) are met;
   f) redirecting the request, if either or both of said steps c) and d) are not met; and
   g) producing a conditional action form showing that the request is redirected, and allowing a user to continue, cancel or postpone a request.

6. A host system for information access over multiple network connections, comprising:
   an information requesting device for requesting information over multiple network connections; and
   a server program including:
      a caching proxy having associated therewith a cache, the caching proxy receiving a request from said information requesting device and checking whether the request can be satisfied from the cache p2 a user interface server for receiving the request from said caching proxy if the request cannot be satisfied by said caching proxy for notifying a user that the request cannot by satisfied by said caching proxy and for allowing the user to continue, cancel or postpone the request; and
   a communication manager for setting up and tearing down connections.

7. A mobile host connectable to a network comprising:
   an information requesting device for requesting information from a network; and
   a server program configured with a set of parameters including user-defined budget conditions that are acceptable for various requests, transactions and network communications, the server program mediating communications between the information requesting device and the network in accordance with the set of parameters.

8. In a communication device for managing time and expense of communications between a mobile host and one of multiple networks connections, a method comprising the steps of:

a) storing a plurality of variables for each multiple network connection defining one or more of user-defined budget conditions for a network connection;

b) notifying a user that one or more of the conditions for a network connection are violated; and c) continuing, canceling or postponing communications between the mobile host and one of the multiple network connections dependent on the violated condition.

9. A method according to claim 8, wherein said step b) includes displaying a page when a condition is violated.

10. A method according to claim 9, wherein the page includes selecting other variables including overriding the violated condition.

11. In a communications system, a communications device for managing time and expense of communications between a mobile host and one of multiple network connections, comprising:

memory for storing a plurality of variables for each one of the multiple network connections, the plurality of variables defining user-defined budget conditions;

a server program for notifying a user that one or more of the variable for a network connection is violated and allowing the user to continue, cancel or postpone an action dependent on the violated variable.

12. A method for managing time/cost of information requests over multiple network connections including a budget monitor, said method comprising the steps of:

a) initiating transmission of a request from a host to one of the multiple network connections; and b) mediating communications, associated with the request, between a host and any one of the multiple network connections, the step b) performing one of the following steps:

i) canceling the request; and ii) informing the user of time/costs of the communications and prompting the user regarding how to proceed, based on one of the characteristics of the request, changing variables that reflect the availability and costs of communication channels, quality of service of the channels, usage and accumulated costs of the channels, and user's pre-specified budget policies, wherein the step b) further performs the substeps of:

iii) postponing user requests for documents; and iv) triggering the postponed user requests at a future time when the time/cost of retrieval satisfies the user's requirements.

13. A method according to claim 12, further comprising the step of:

c) indicating to the user the time/cost after traversing a hypertext link.

14. A method according to claim 13, wherein said step c) comprises the substep of showing which hypertext links are in a local cache.

15. A host system for accessing information across multiple network connections, the system comprising:

an information requesting device for requesting information across any one of multiple network connections; and a server program, configured to receive requests from the information requesting device, for automatically controlling a sending of the requests over any one of the multiple network connections in accordance with user-defined budget conditions.

16. A host system according to claim 15 further comprising multiple network interfaces for establishing respective multiple network connections, the server program automatically switching among the multiple network interfaces based on the budget conditions to establish a network connection from the multiple network connections.

17. A host system according to claim 15 wherein the server program is configured to receive all requests from the information requesting device and to control a sending of all requests over any one of the multiple network connections.

18. A host system for accessing information across multiple network connections, the system comprising:

an information requesting device for transmitting a request for information across any one of multiple network connections; and a server program for mediating communications, associated with the request, between the information requesting device and any one of the multiple network connections in accordance with user-defined budget conditions, the server program notifying the user if at least one budget condition is violated.

19. A host system according to claim 18, wherein the server program enables the user to perform an action selected from the group consisting of continuing the request, canceling the request, postponing the request and implementing a new action to be performed by the information requesting device, if at least one budget condition is violated.

20. A host system according to claim 18, wherein communications is further mediated according to communication constraints selected from the group consisting of availability of communication channels, costs of the communication channels, quality of service of the channels, and usage and accumulated costs of the channels.

21. An article of manufacture comprising:

a computer readable medium having computer usable program code embodied therein, said computer usable program code containing executable instructions that when executed, cause a host system including an information requesting device for requesting information over multiple network connections to perform the following:

automatically controlling a sending of a request from the information requesting device over any one of the multiple network connections in accordance with user-defined budget conditions.

22. The article of manufacture according to claim 21, wherein the automatically controlling automatically switches among the multiple network connections in accordance with the budget conditions.

23. An article of manufacture comprising:

a computer readable medium having computer usable program code embodied therein, said computer usable program code containing executable instructions that when executed, cause a host system including an information requesting device for requesting information over multiple network connections to perform the following:

evaluating whether the information request from the information requesting device violates any user-defined budget conditions; and notifying the user if at least one budget condition is violated.

24. The article of manufacture according to claim 23, wherein the evaluating includes monitoring communications between the information request and the multiple network connections associated with the request to determine whether at least one budget condition is violated.

25. The article of manufacture according to claim 23, wherein said computer usable program code containing executable instructions that when executed, cause a host system including an information requesting device for requesting information over multiple network connections to perform further the following:

enabling the user to perform an action selected from the group consisting of continuing the request, canceling the request, postponing the request and implementing a new action to be performed by the information requesting device, if at least one budget condition is violated.

26. The article of manufacture according to claim 23, wherein said computer usable program code containing executable instructions that when executed, cause a host system including an information requesting device for requesting information over multiple network connections to perform further the following:

performing an action selected from the group consisting of continuing the request, canceling the request and postponing the request, depending on the violated budget condition.

* * * * *